(12) United States Patent
Dold et al.

(10) Patent No.: US 7,884,279 B2
(45) Date of Patent: Feb. 8, 2011

(54) SOLAR TRACKER

(75) Inventors: Robert H. Dold, Monson, MA (US);
Jeffrey J. Nieter, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 659 days.

(21) Appl. No.: 11/376,849

(22) Filed: Mar. 16, 2006

(65) Prior Publication Data
US 2007/0215199 A1    Sep. 20, 2007

(51) Int. Cl.
*H01L 31/045* (2006.01)
(52) U.S. Cl. .............. 136/246; 136/243; 136/244; 136/245
(58) Field of Classification Search .............. 136/245, 136/246
See application file for complete search history.

(56) References Cited

U.S. PATENT DOCUMENTS

| | | | |
|---|---|---|---|
| 4,256,088 A | | 3/1981 | Vindum |
| 4,404,565 A | * | 9/1983 | Gurney et al. ............ 343/881 |
| 4,830,678 A | | 5/1989 | Todorof et al. |
| 4,930,493 A | | 6/1990 | Sallis |
| 5,022,929 A | * | 6/1991 | Gallois-Montbrun ....... 136/246 |
| 5,269,851 A | | 12/1993 | Horne |
| 5,317,145 A | * | 5/1994 | Corio ...................... 250/203.4 |
| 5,986,203 A | * | 11/1999 | Hanoka et al. ............. 136/251 |
| 6,080,927 A | | 6/2000 | Johnson |
| 6,284,968 B1 | * | 9/2001 | Niesyn ..................... 136/246 |
| 6,662,801 B2 | * | 12/2003 | Hayden et al. ............. 126/571 |
| 6,780,365 B2 | * | 8/2004 | Goldbach ................. 264/251 |
| 2002/0074034 A1 | | 6/2002 | Fujisaki |
| 2002/0121298 A1 | | 9/2002 | Konold |
| 2003/0070705 A1 | | 4/2003 | Hayden et al. |
| 2004/0025931 A1 | | 2/2004 | Aguglia |
| 2004/0055631 A1 | | 3/2004 | Szymocha |
| 2005/0081908 A1 | | 4/2005 | Stewart |
| 2005/0133082 A1 | | 6/2005 | Konold |

FOREIGN PATENT DOCUMENTS

| | | |
|---|---|---|
| CN | 85203323 U | 8/1986 |
| FR | 2535033 A1 | 4/1984 |
| WO | 2004044502 A1 | 5/2004 |
| WO | WO 2004/070281 | 8/2004 |
| WO | WO 2004/099682 | 11/2004 |

OTHER PUBLICATIONS

Website http://www.newwavetruss.com/about.html.
First Office Action, Chinese Patent Office, Application No. 200780017811.0, mailed Feb. 5, 2010.

* cited by examiner

*Primary Examiner*—Jennifer K Michener
*Assistant Examiner*—Jayne Mershon
(74) *Attorney, Agent, or Firm*—Carlson Gaskey & Olds P.C.

(57) ABSTRACT

A two-axis solar tracker is capable of withstanding extreme weather conditions. The solar tracker includes a solar array, a frame, a base, a pivot frame, and a first and second actuator. The solar array is mounted to the frame and captures sunlight. The base is pivotally connected to the frame and defines a pivot axis for elevational movement of the solar array. The pivot frame is also pivotally connected to the frame and defines a pivot axis for azimuthal movement of the solar array. The first actuator controls elevational movement of the solar array and the second actuator controls azimuthal movement of the solar array. The solar tracker is pivotable between a raised position and a stowed position.

25 Claims, 11 Drawing Sheets

SOLAR TRACKER

BACKGROUND OF THE INVENTION

Solar cells, or photovoltaic cells, have the ability to convert sunlight directly into electricity. In order to capture the maximum amount of sunlight during the day, a tracker is connected to the cells and continuously aligns the light-absorbing panels of the cells in a direction perpendicular to rays from the sun so that the cells can absorb the highest amount of energy from the rays of sunlight. This is particularly important for high performance solar panels having concentrated cells. Current trackers are typically dual axis tracking systems having a linear actuator for elevational control and a geared or linear motor for azimuthal control. However, geared motors can be expensive and add to the cost of producing the tracker.

One problem with current tracker systems is that they are designed to mount on a post and have no means of stowing in extreme winds. Thus, the wind load resistance of the tracker system is low and can result in damage to the tracker or to the solar panels during extreme winds. It would thus be beneficial to be able to either increase the wind load resistance of the tracker or to fold the tracker into a stowed position during extreme weather conditions to reduce the potential of damage to the tracker or the solar panels. Additionally, because current tracker systems are designed to mount on a post, all of the loading is transferred to the base of the post, hindering the ability to integrate the solar tracker onto a building structure. In order to mount the solar trackers on a building structure, the mounting point for the tracker post must be designed to distribute the load of the tracker into the building structural members.

BRIEF SUMMARY OF THE INVENTION

A two-axis solar tracker is capable of withstanding extreme weather conditions. The solar tracker includes a solar array, a frame, a base, a pivot frame, and a first and second actuator. The solar array is mounted to the frame and captures sunlight. The pivot frame is pivotally connected to the frame and defines a pivot axis for azimuthal movement of the solar array. The base is pivotally connected to the pivot frame and defines a pivot axis for elevational movement of the solar array. The first actuator controls azimuthal movement of the solar array and the second actuator controls elevational movement of the solar array. The solar tracker is pivotable between a raised position and a stowed position.

DETAILED DESCRIPTION

Figure 1A:
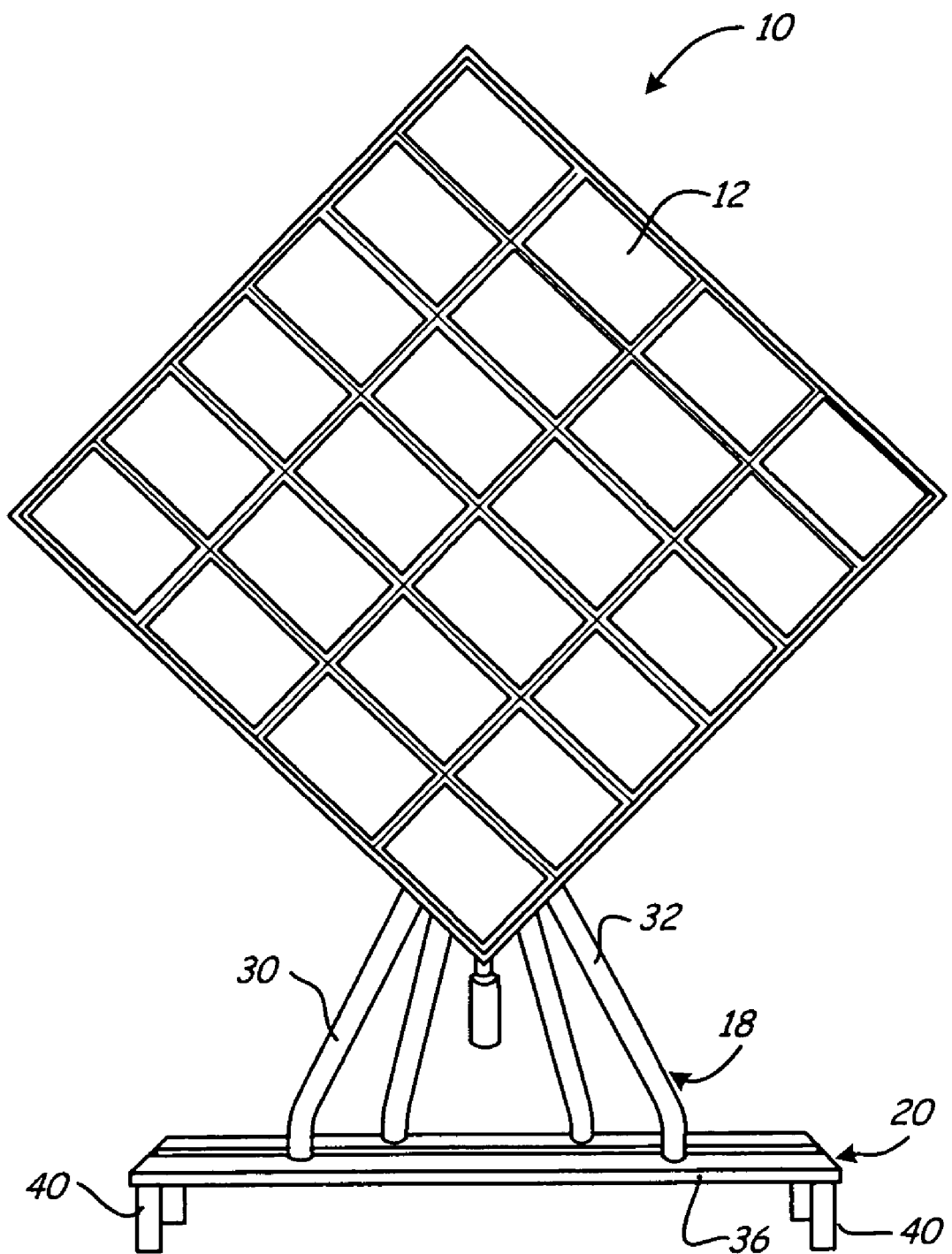
FIG. 1A is a front perspective view of a first embodiment of a solar tracker.
Figure 1B:
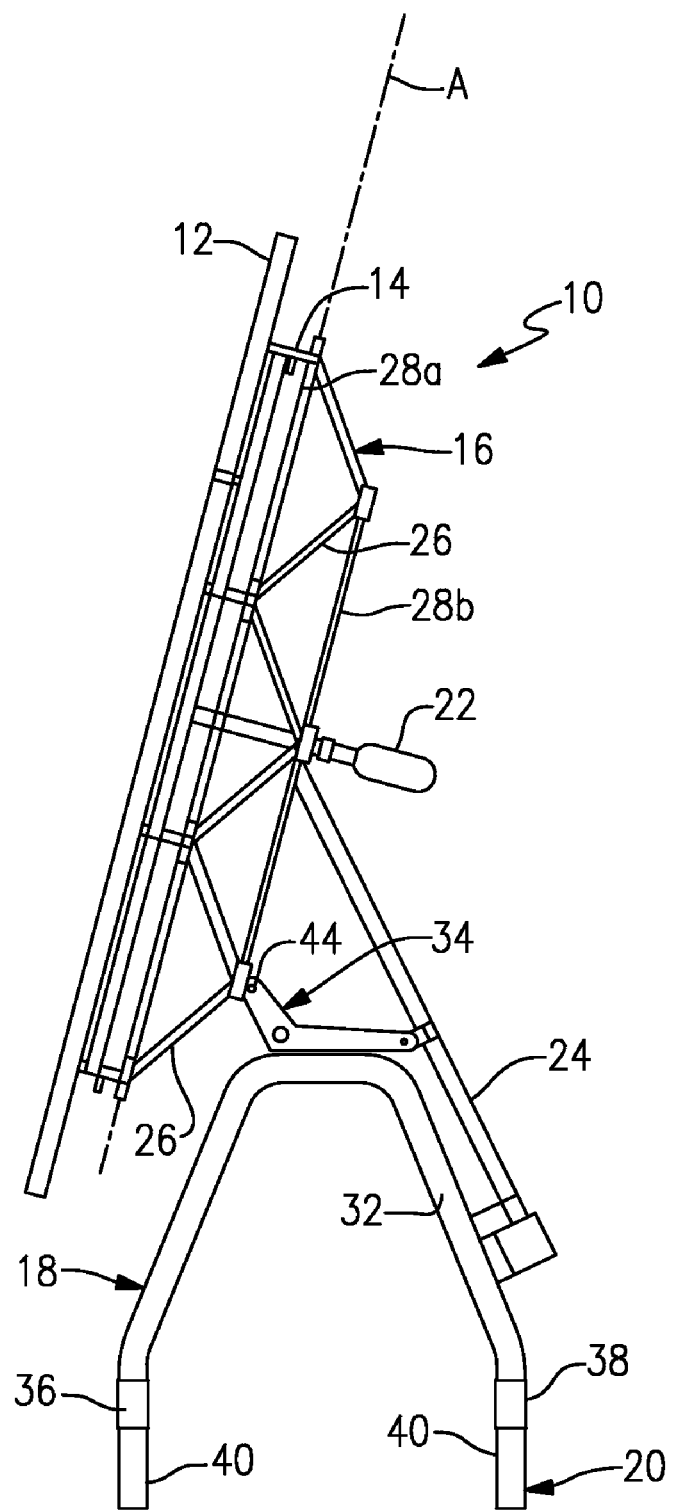
FIG. 1B is a side perspective view of the first embodiment of a solar tracker.

FIGS. 1A and 1B show a front view and a side view, respectively, of a first embodiment of two-axis solar tracker 10 in a raised position and will be discussed in conjunction with one another. Solar tracker 10 generally includes solar array 12 consisting of multiple panels, frame 14, truss 16, base 18, leg mount 20, first actuator 22, and second actuator 24. Truss 16 is a stiff, lightweight, and cost-effective support for solar array 12 and is pivotable relative to frame 14 and base 18. In order to protect solar array 12 during extreme weather conditions, solar tracker 10 is pivotable between a raised position and a stowed position. Solar tracker 10 with truss 16 has increased wind load resistance and is adaptable to various building structures while using conventional linear actuators.

Solar tracker 10 is designed to align solar array 12 with respect to the sun so that it collects the maximum amount of solar energy. Solar energy is absorbed into solar array 12 where it is subsequently converted to useable energy. Solar array 12 absorbs the maximum amount of solar energy when solar array 12 is aligned normal to the rays of the sun. Solar array 12 is thus mounted to solar tracker 10, which continually positions solar array 12 relative to the position of the sun. As can be seen in FIGS. 1A and 1B, solar array 12 can be formed from a plurality of smaller solar panels that are positioned proximate one another to form a large solar array. This allows solar array 12 to capture more sunlight. In one embodiment, the smaller solar panels are positioned relative to one another to form a diamond shaped array in order to provide less deflection as well as corner-to-corner support.

Truss 16 is mounted to frame 14 about an azimuthal axis A and is pivotally connected to base 18 about an elevation axis E. The triangular shape of truss 16 provides increased wind load resistance for solar tracker 10. Truss 16 is formed from a plurality of truss sections 26 held together by a plurality of tubes 28. In one embodiment, truss 16 is formed of a lightweight material, such as aluminum. Alternatively, truss 16 can be molded from a glass reinforced nylon or other thermoplastic.

Base 18 connects solar array 12 to leg mount 20 and generally includes first leg 30, second leg 32, and actuator mount 34. First and second legs 30, 32 of base 18 spread the load of solar tracker 10. Actuator mount 34 is mounted to base 18 and pivotally connects truss 16 to base 18 so that solar array 12 can follow the elevation of the sun about elevation axis E, as well as pivot between a raised position and a stowed position.

Leg mount 20 generally includes horizontal first and second supports 36, 38 that connect base 18 to leg mount 20. Both first and second supports 36, 38 have attachment posts 40 that allow installation of solar tracker 10 onto a building structure.

First and second actuators 22, 24 provide two-axis tracking of solar tracker 10. First actuator 22 controls azimuthal movement of solar array 12 and second actuator 24 controls elevational movement of solar array 12. In one embodiment, first and second actuators 22, 24 are linear actuators.

Figure 2:
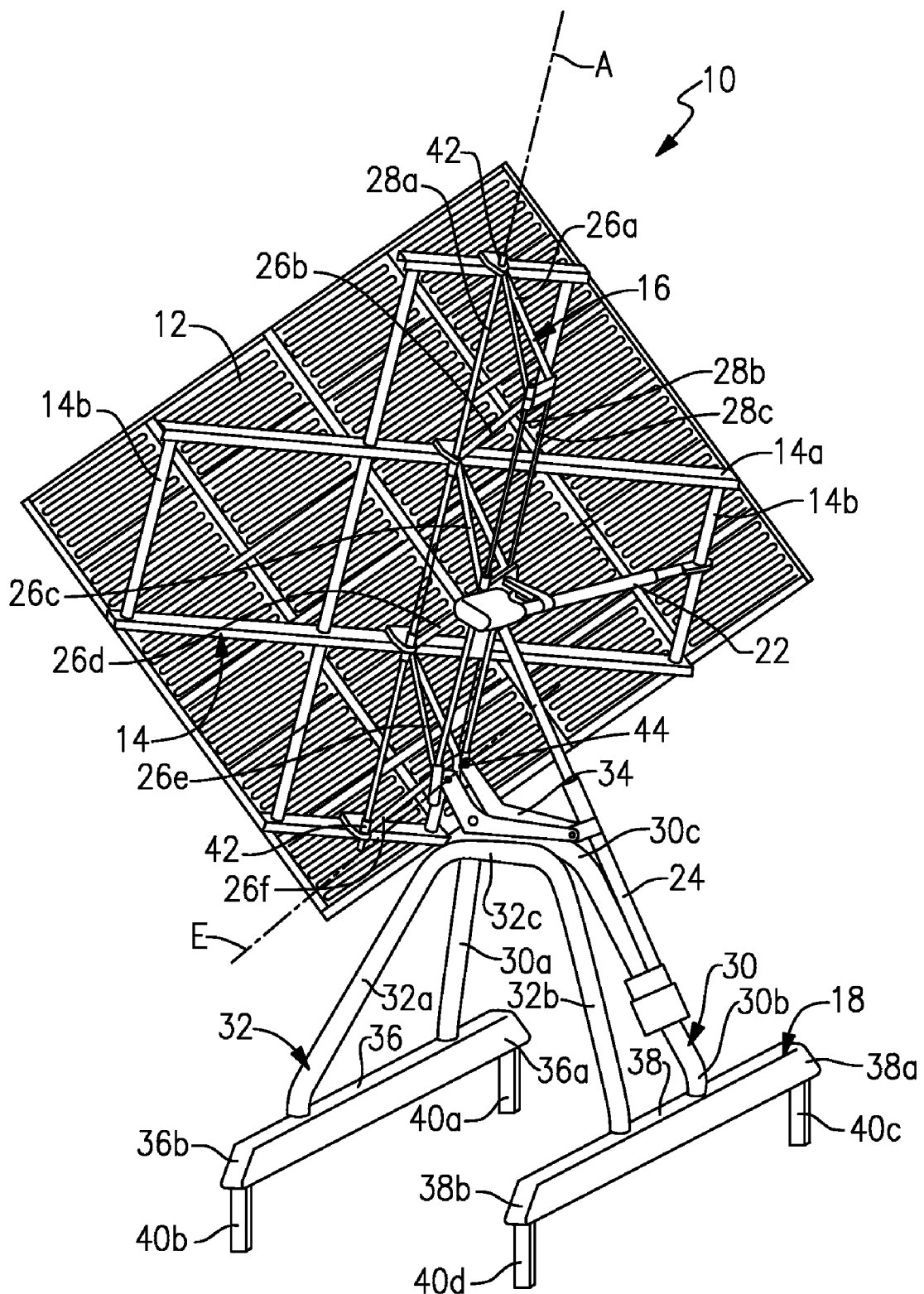
FIG. 2 is a rear perspective view of the first embodiment of a solar tracker in a raised position.

FIG. 2 shows a rear view of solar tracker 10 with truss 16 mounted on frame 14. Frame 14 is mounted to the back of solar array 12 and extends across two dimensions of solar array 12. Frame 14 is formed from a plurality of supports 14a, 14b positioned relative to one another to form an array. If solar array 12 is formed from a plurality of smaller solar panels, frame 14 also maintains the plurality of smaller solar panels in position relative to one another. Truss 16 is attached to frame 14 and in combination with first and second actuators 22, 24, controls the alignment of solar array 12 relative to the sun. Although FIG. 2 depicts plurality of supports 14a, 14b positioned at intersecting right angles, supports 14a, 14b can be formed in any type of array as long as frame 14 can support truss 16 and maintain smaller solar panels relative to one another.

Truss 16 is mounted to frame 14 and connects solar array 12 to base 18. Truss 16 is formed from a plurality of truss sections 26a, 26b, 26c, 26d, 26e, 26f (collectively truss sections 26) held together by first tube 28a, second tube 28b, and third tube 28c (collectively tubes 28). First tube 28a pivotally connects truss 16 to frame 14 at frame pivot joints 42 which defines azimuth axis A and allows truss 16 to support solar array 12. Truss 16 is also pivotally connected to base 18 by actuator mount 34 at base pivot joint 44 in order to continually align solar array 12 with respect to the sun about the elevation axis E.

First leg 30 of base 18 has a first end 30a, a second end 30b, and a central portion 30c. First end 30a and second end 30b are spaced apart from each other and are connected by central portion 30c. Similarly, second leg 32 of base 18 has a first end 32a, a second end 32b, and a central portion 32c. First end 32a and second end 32b are also spaced apart from each other and are connected by central portion 32c. First and second legs 30 and 32 are connected to each other at central portions 30c, 32c with first ends 30a, 32a of first and second legs 30, 32 spaced apart from each other in a V-shape and second ends 30b, 32b of first and second legs 30, 32 spaced apart from each other in a V-shape. Actuator mount 34 is mounted to base 18 where central portions 30c, 32c of first and second legs 30, 32 are connected.

First and second supports 36, 38 of leg mount 20 stabilize base 18 and solar array 12. First support 36 has a first end 36a and a second end 36b and second support 38 has a first end 38a and a second end 38b. First ends 30a, 32a of first and second legs 30, 32 are attached to first support 36 between first and second ends 36a, 36b of first support 36. Second ends 30b, 32b of first and second legs 30, 32 are attached to second support 38 between first and second ends 38a, 38b of second support 38. First and second supports 36, 38 have attachment posts 40a, 40b, 40c, 40d (collectively attachment posts 40) located at each of first and second ends 36a, 36b and 38a, 38b that allow installation of solar tracker 10 onto a building structure. Although FIG. 2 depicts leg mount 20 as having first and second supports 36, 38, solar panel 12 may be mounted on any support known in the art. Similarly, although FIG. 2 depicts attachment posts 40 as four separate posts, any means known in the art for mounting a device onto a structure can be used to mount solar tracker 10 to the building structure.

Figure 3:
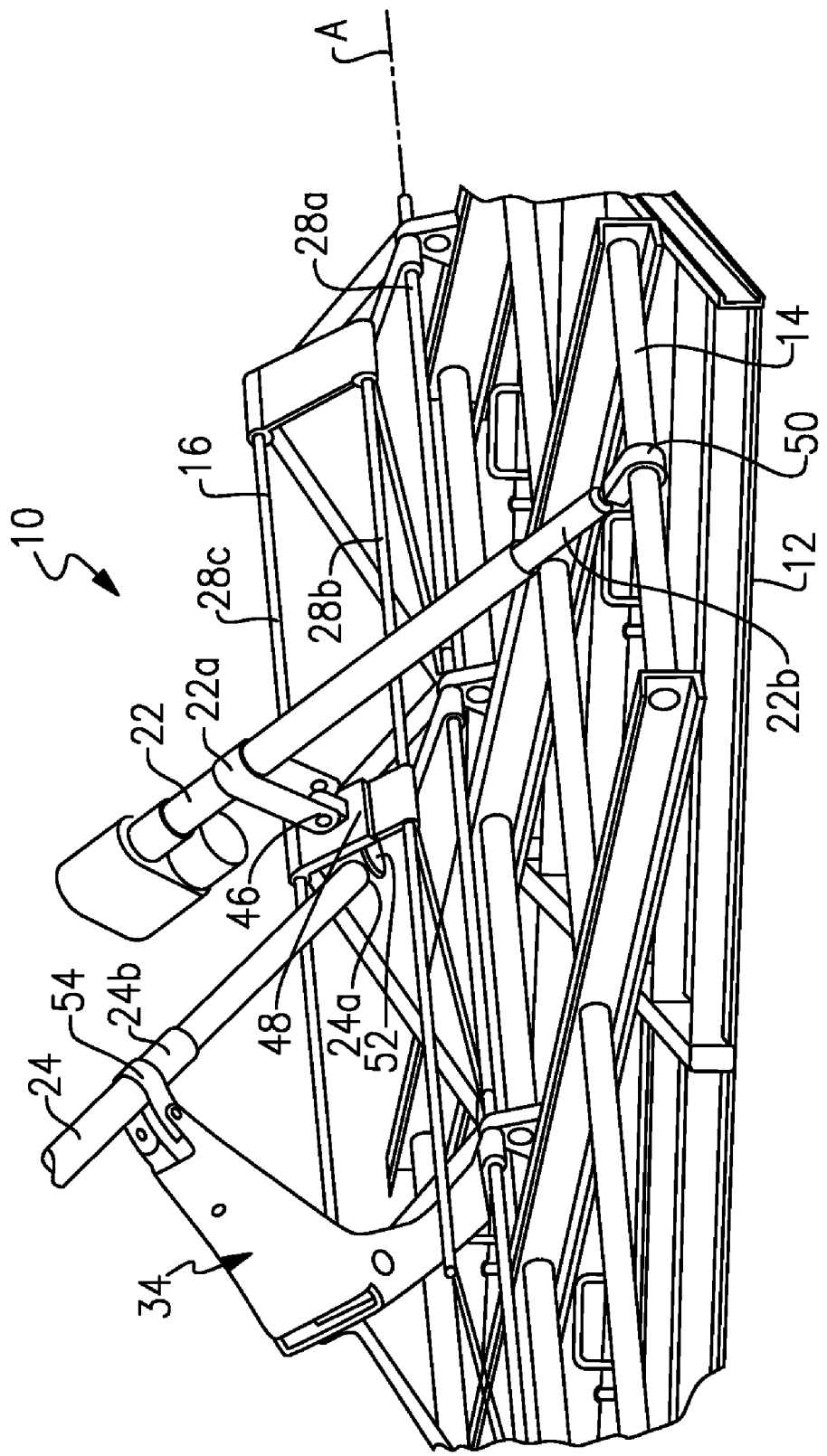
FIG. 3 is a magnified partial top and rear view of a solar array of the first embodiment of the solar tracker.

To better illustrate the attachment points of first and second actuators 22 and 24, FIG. 3 shows a magnified partial top and rear view of solar array 12 with base 18 removed. First actuator 22 has a first end 22a pivotally connected to truss 16 at a first pivot joint 46 of a connector 48 positioned between second tube 28b and third tube 28c, and a second end 22b pivotally connected to frame 14 at pivot joint 50. First actuator 22 thus pivots solar array 12 about axis A defined by first tube 28a of truss 16 as first actuator 22 telescopes in and out, controlling movement of solar array 12 in an azimuthal direction. First tube 28a therefore defines the azimuthal axis A for azimuthal movement of solar tracker 10.

Second actuator 24 has a first end 24a pivotally connected to truss 16 at a second pivot joint 52 of connector 48 positioned between second tube 28b and third tube 28c, and a middle portion 24b pivotally connected to actuator mount 34 by pivot joint 54. Second actuator 24 thus pivots solar array 12 about axis E defined by base pivot joint 44 as second actuator 22 telescopes in and out, controlling movement of solar array 12 in an elevational direction. Base 18 (through pivot joint 44) therefore defines the elevation axis E for elevational movement of solar tracker 10. First pivot joint 46 is generally transverse to second pivot joint 52

Figure 4:
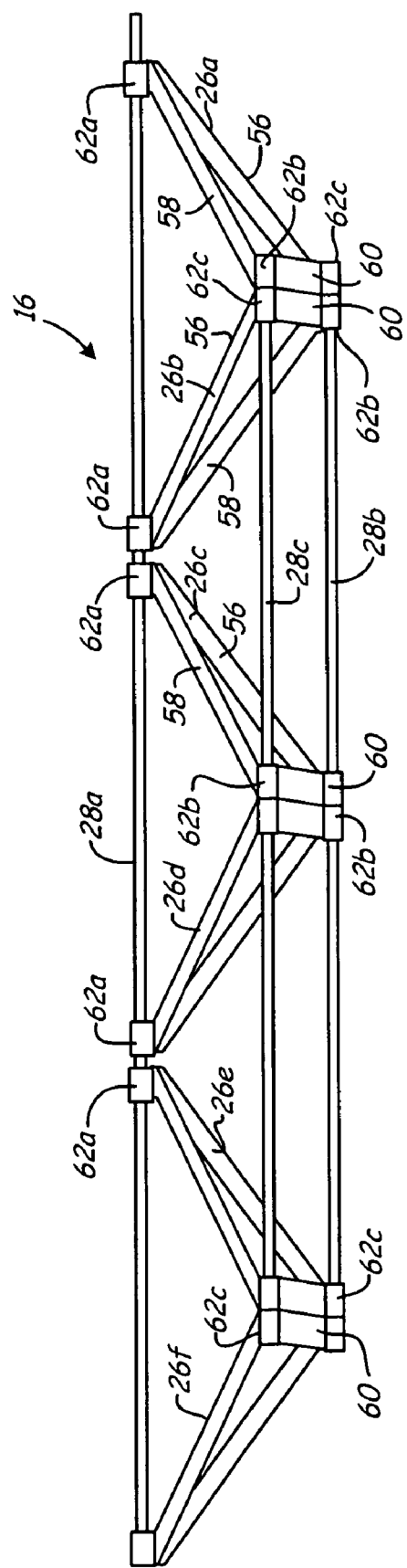
FIG. 4 is a magnified perspective view of a truss of the first embodiment of the solar tracker.

FIG. 4 shows a magnified perspective view of truss 16. Each of first, second, third, fourth, fifth, and sixth truss sections 26a, 26b, 26c, 26d, 26e, 26f (collectively, truss sections 26) has a first side 56, a second side 58, and a third side 60 that together form a triangular shape. First, second, and third pivot holes 62a, 62b, 62c (collectively pivot holes 62) are located between first, second, and third sides 56, 58, 60 and are sized to accept tubes 28. First pivot hole 62a is located between first and second sides 26a, 26b, second pivot hole 62b is located between second and third sides 26b, 26c, and third pivot hole 62c is located between third and first sides 26c, 26a.

To form truss 16, truss sections 26 are sliced at an angle from a truss extrusion and are subsequently assembled together with tubes 28. First and second truss sections 26a, 26b are first aligned so that second pivot hole 62b of first truss section 26a abuts third pivot hole 62c of second truss section 26b and third pivot hole 62c of first truss section 26a abuts second pivot hole 62b of second truss section 26b. In this arrangement, first pivot holes 62a of first and second truss sections 26a, 26b are spaced apart. Third truss section 26c is then aligned with second truss section 26b such that first pivot holes 62a of second and third truss sections 26b and 26c are proximate each other but second and third pivot holes 62b, 62c are spaced apart. This pattern is repeated for the length of truss 16.

After truss sections 26 have been properly positioned relative to one another, first tube 28a is passed through first pivot holes 62a of truss sections 26. Second and third tubes 28b, 28c are then passed through alternating second and third pivot holes 62b, 62c of truss sections 26 on either side of truss 16. After tubes 28 are positioned within pivot holes 62 of truss sections 26, truss 16 is held together using epoxy. Other adhesive means or mechanical fasteners known in the art may also be used to hold truss 16 as a single unit. The triangular shape of truss 16 allows truss sections 26 to be spaced apart, resulting in increased resistance to side loads imparted to solar array 12 due to wind loading. Although FIG. 4 depicts truss 16 as having six truss sections 26a-26f forming truss 16, truss 16 may include as many truss sections as necessary to support solar array 12.

Figure 5:
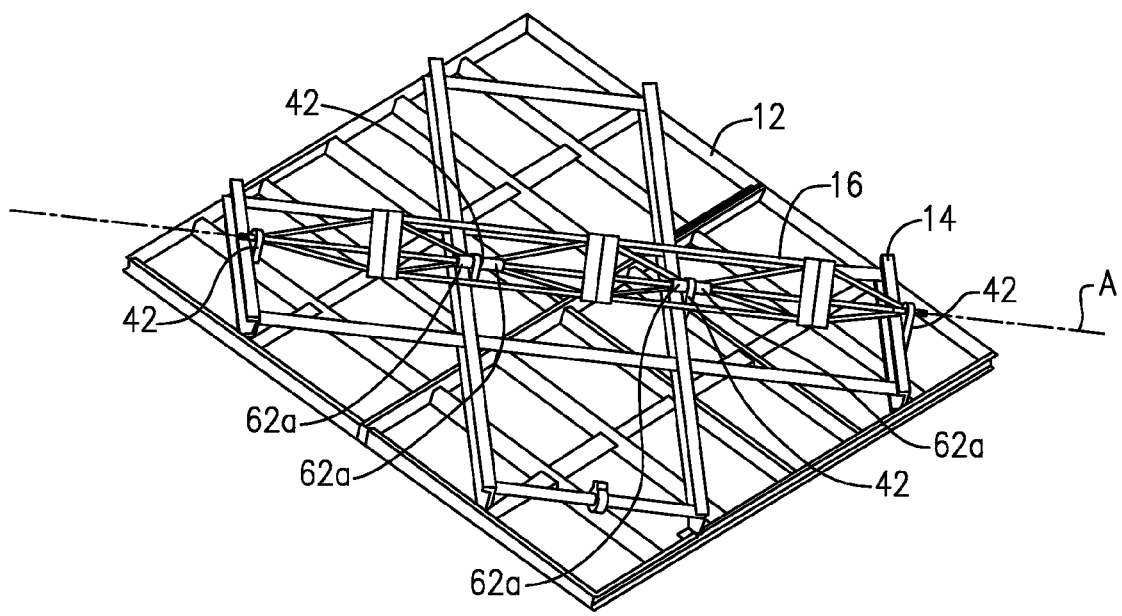
FIG. 5 is a magnified rear view of the first embodiment of the solar array with the truss mounted on the solar tracker.

FIG. 5 shows a magnified back view of solar array 12 with truss 16 mounted to frame 14. After truss 16 has been assembled, truss 16 is mounted to frame 14 at intermediate points along first tube 28a. First tube 28a is connected to frame 14 by frame pivot joints 42 of frame 14 between first pivot holes 60a. Although FIG. 5 depicts truss 16 as extending diagonally across diamond-shaped solar array 12, truss 16 may also extend down the center of the array, similar to a conventional tracking array. Positioning truss 16 diagonally across solar array 12 provides the maximum amount of support to solar array 12.

Figure 6:
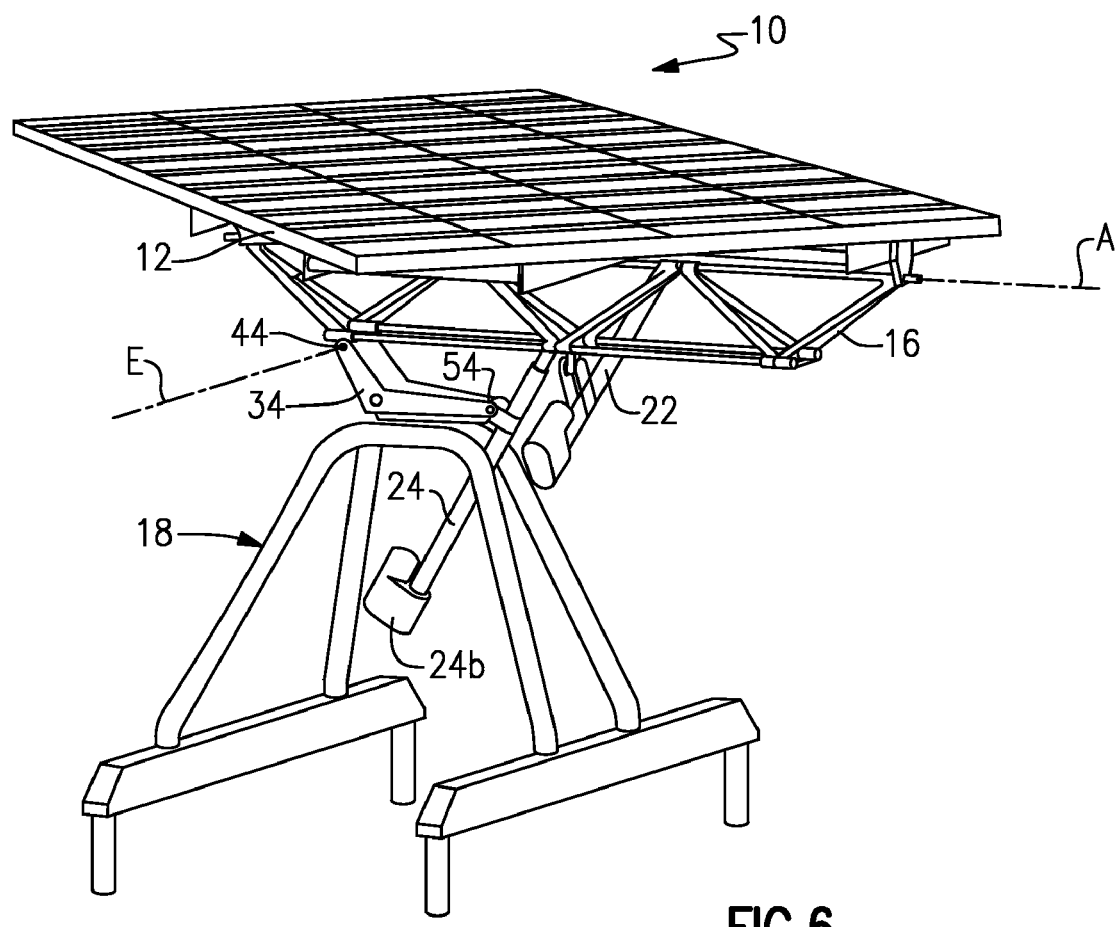
FIG. 6 is a perspective view of the first embodiment of the solar tracker in a stowed position.

FIG. 6 shows solar tracker 10 in a stowed position. In operation, solar tracker 10 can be in either a raised position (shown in FIGS. 1A, 1B, and 2) or a stowed position. When it is desired that solar array 12 absorb solar energy, solar tracker 10 is in the raised position so that solar array 12 can capture as much sunlight as possible. However, in extreme weather conditions, such as high winds, solar tracker 10 is moved into the stowed position in order to protect solar array 12 from damage. To move solar tracker 10 into the stowed position, second actuator 24 retracts and pivots at pivot joint 54 to cause solar array 12 to pivot about pivot joint 44 of actuator mount 34. Solar array 12 pivots about pivot joint 44 until solar array 12 is substantially parallel to the ground. Truss 16 is capable of withstanding side load resistance and maintains solar array 12 stable relative to base 18 and leg mount 20. In the stowed position, solar tracker 10 is better shielded from extreme weather conditions and flying debris that may damage solar array 12. In one embodiment, solar array 12 includes a wind sensor and controller that align solar array 12 with the wind in order to minimize the wind loading of solar tracker 10.

Figure 7:
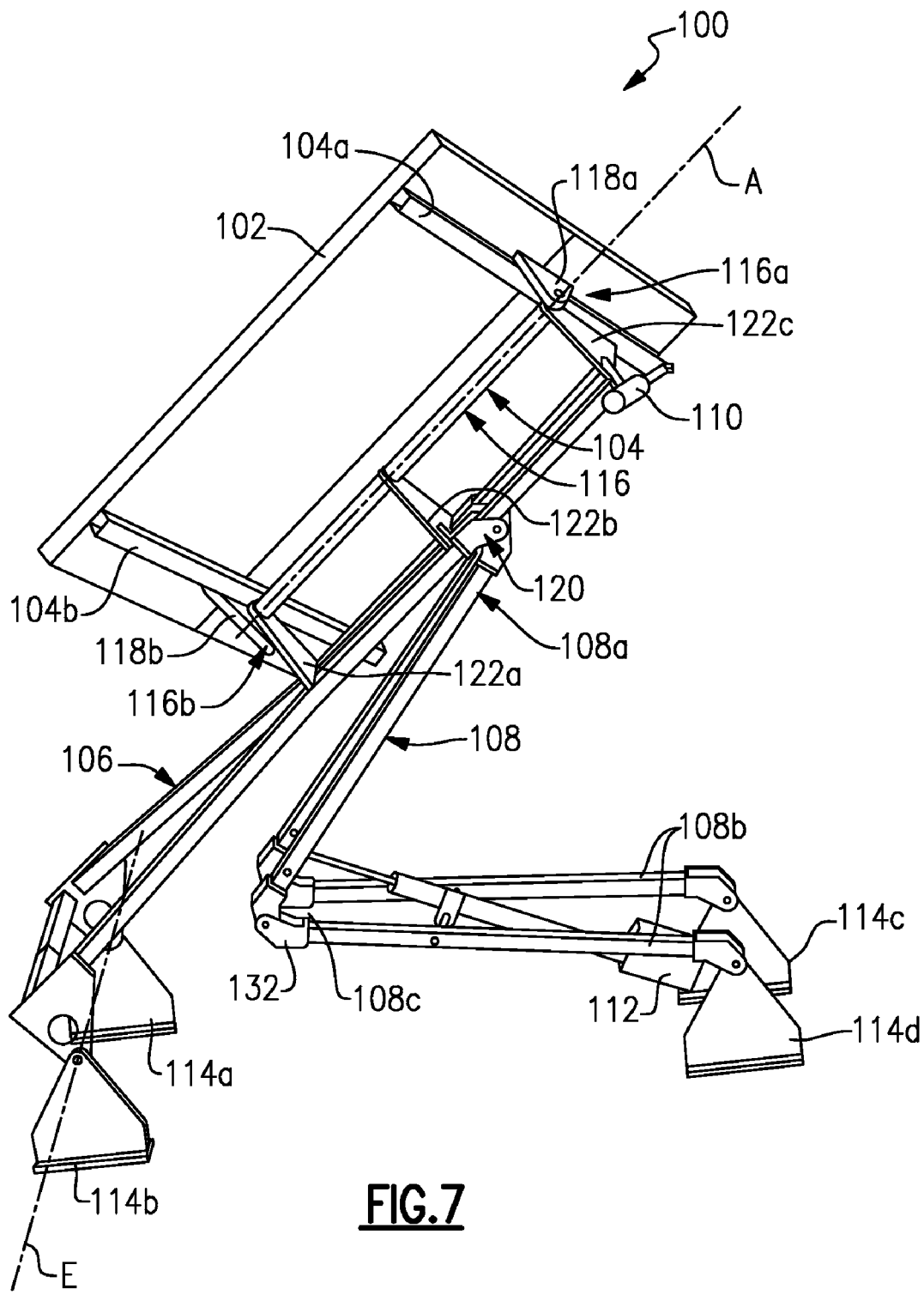
FIG. 7 is a perspective view of a second embodiment of the solar tracker in a raised position.

FIG. 7 shows a perspective view of a second embodiment of solar tracker 100 in a raised position. Solar tracker 100 generally includes solar array 102, frame 104, first linkage arm 106, second linkage arm 108, first actuator 110, second actuator 112, and leg mounts 114a-114d. Linkage arms 106, 108 of solar tracker 100 allow solar array 102 to be moved into a stowed position during high winds. Solar array 102 of solar tracker 100 functions in the same manner as solar array 12 of solar tracker 10. Similar to solar tracker 10, solar tracker 100 is also pivotable between a raised position and a stowed position, uses conventional linear actuators, and is adaptable to various building structures.

Frame 104 is attached to solar array 102 and connects solar array 102 to first and second linkage arms 106, 108. Frame 104 generally includes horizontal crossbars 104a and 104b and pivot frame 116. Pivot frame 116 has a first end 116a and a second end 116b. First end 116a of pivot frame 116 is connected to crossbar 104a of frame 104 by first connector 118a. Second end 116b of pivot frame 116 is connected to crossbar 104b of frame 104 by second connector 118b. Although FIG. 7 depicts frame 104 of solar tracker 100 as including two crossbars 104a, 104b and a single pivot frame 116, frame 104 can be any structure known in the art that allows pivotal connection of at least one of first and second linkage arms 106, 108 to solar array 102.

First and second linkage arms 106, 108 are pivotally connected to each other by pivot joint 120. First and second linkage arms 106, 108 are also connected to frame 104 by first, second, and third connectors 122a, 122b, 122c connected to first linkage arm 106. Although FIG. 7 depicts two linkage arms 106, 108 pivotally connected to each other, solar tracker 100 may also be constructed with a scissor-type supporting structure or with a single actuator that provides the lift mechanism without departing from the intended scope of the present invention.

First and second actuators 110, 112 provide two-axis tracking of solar tracker 100. First actuator 110 controls azimuthal movement of solar array 102 about azimuthal axis A. Second actuator 112 controls elevational movement of solar array 102 about elevation axis E. In one embodiment, first and second actuators 110 and 112 are linear actuators.

Leg mounts 114a-114d are pivotally attached to first and second linkage arms 106, 108 and allow installation of solar tracker 100 to a range of locations, such as an existing roof support beam of a commercial building. Although FIG. 7 depicts leg mounts 114a-114d as four separate attachment structures, any means known in the art for mounting a device onto a structure can be used to mount solar tracker 100 to the building structure.

Figure 8A:
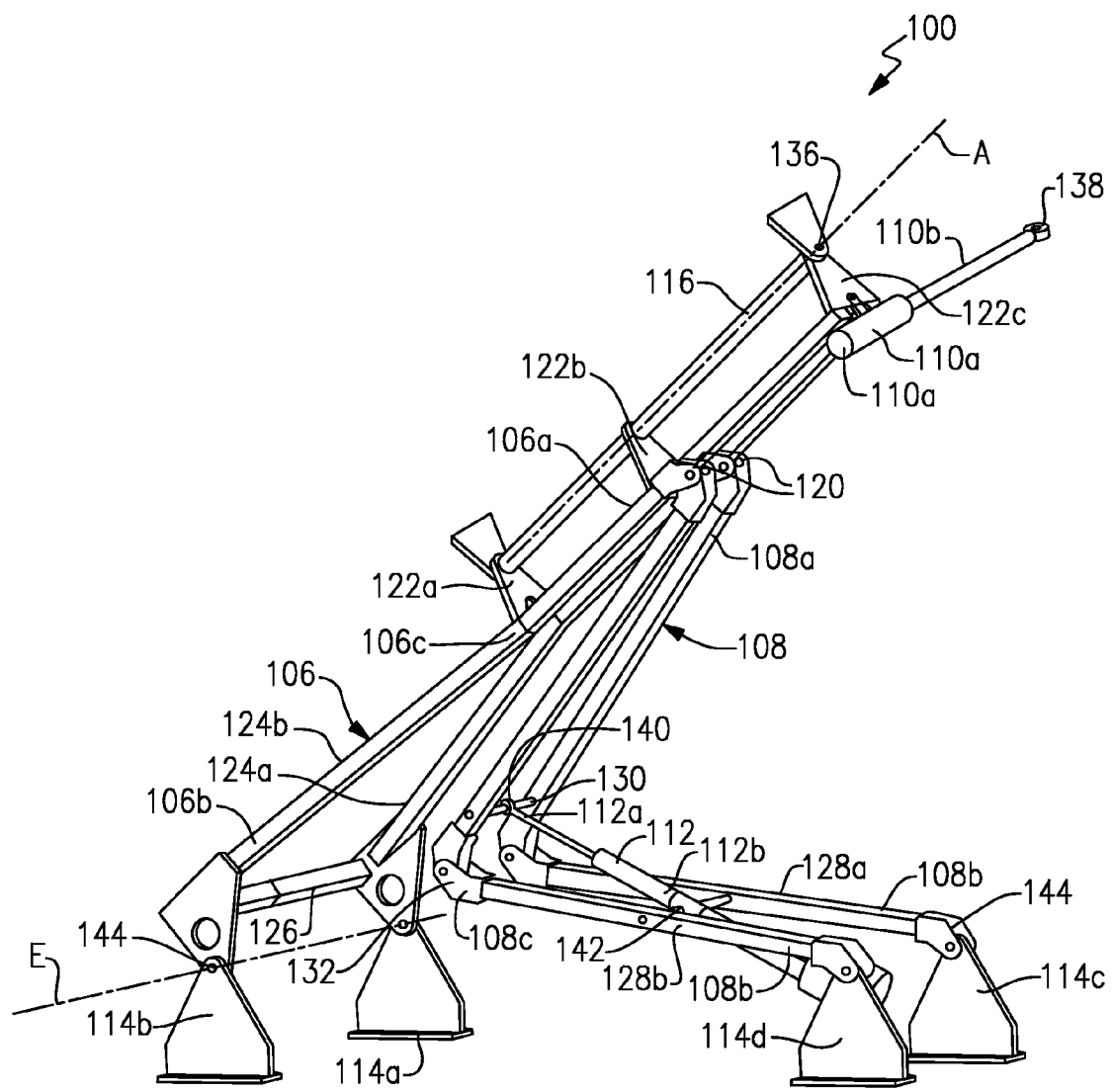
FIG. 8A is a partial magnified view of the second embodiment of the solar tracker.
Figure 8B:
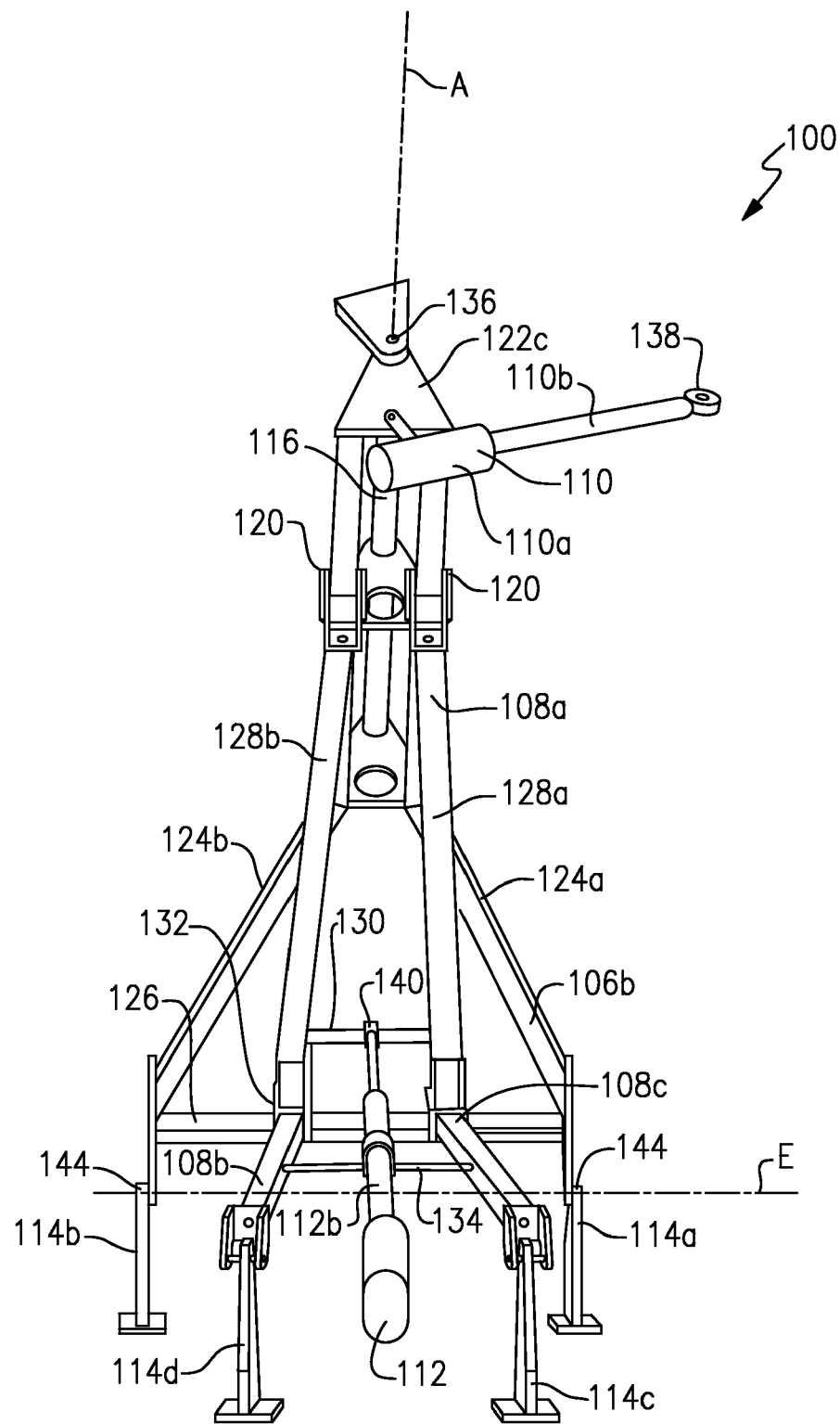
FIG. 8B is a partial rear view of the second embodiment of the solar tracker.

FIGS. 8A and 8B show a magnified partial view of solar tracker 100 and a partial rear view of solar tracker 100, respectively, and will be discussed in conjunction with one another. Solar array 102 has been removed in FIGS. 8A and 8B. First linkage arm 106 has a first end 106a, a second end 106b, and a center point 106c and includes first and second legs 124a, 124b. First and second legs 124a, 124b are parallel to each other from first end 106a to center point 106c. At center point 106c, first and second legs 124a, 124b branch out and extend away from each other to form a triangular shape so that first and second legs 124a, 124b are spaced from each other at second end 106b. First and second legs 124a, 124b are connected to each other at second section 106b by crossbar 126.

Similarly, second linkage arm 108 also has a first section 108a, a second section 108b, and an intermediate section 108c and includes first and second legs 128a, 128b. First and second legs 128a, 128b extend away from each other slightly from first section 108a to the intermediate section 108c. First and second legs 128a, 128b are connected to each other at intermediate section 108c by intermediate crossbar 130. Pivot joint 132 at intermediate section 108c facilitates elevational movement of solar tracker 100 about elevation axis E. At the intermediate section 108c, first and second legs 128a, 128b branch out and extend away from each other to form a triangular shape so that first and second legs 128a, 128b are spaced from each other at second section 108b. First and second legs 128a, 128b are connected to each other by stabilizing crossbar 134.

First actuator 110 has a first end 110a and a middle portion 110b. First end 110a of first actuator 110 is pivotally connected to solar array 102 at pivot joint 136 and middle portion 110b of first actuator 110 is pivotally attached to frame 104 by pivot joint 138. First actuator 110 thus pivots solar array 102 about pivot frame 116 as first actuator 110 telescopes in and out, to control movement of solar array 102 in an azimuthal direction about azimuthal axis A. Pivot frame 116 therefore defines the azimuthal axis A for azimuthal movement of solar tracker 100.

Second actuator 112 has a first rod 112a and a middle cylinder 112b. First rod 112a of second actuator 112 is pivotally connected to second linkage arm 108 at intermediate crossbar 130 by pivot 140. Middle cylinder 112b of second actuator 112 is pivotally attached to stabilizing crossbar 134 by pivot joint 142. As second actuator 112 telescopes in and out, first linkage arm 106 pivots about first and second leg mounts 114a and 114b, pivoting solar array 102 about pivot joints 144 connecting first linkage arm 106 to first and second leg mounts 114a and 114b. This controls movement of solar array 102 in an elevational direction. The connection of first and second leg mounts 114a, 114b to second linkage arm 106 therefore defines a pivot axis for elevational movement of solar tracker 100. In the embodiment shown, first and second actuators 110 and 112 are linear actuators.

Leg mounts 114a, 114b are pivotally attached to first and second legs 124a, 124b of first linkage arm 106, respectively, at second section 106b of first linkage arm 106. Leg mounts 114c and 114d are pivotally attached to first and second legs 128a and 128b of second linkage arm 108, respectively, at second section 108b of second linkage arm 108. Pivot joints 144 pivotally connect leg mounts 114a-114d to first and second linkage arms 106, 108.

Figure 9:
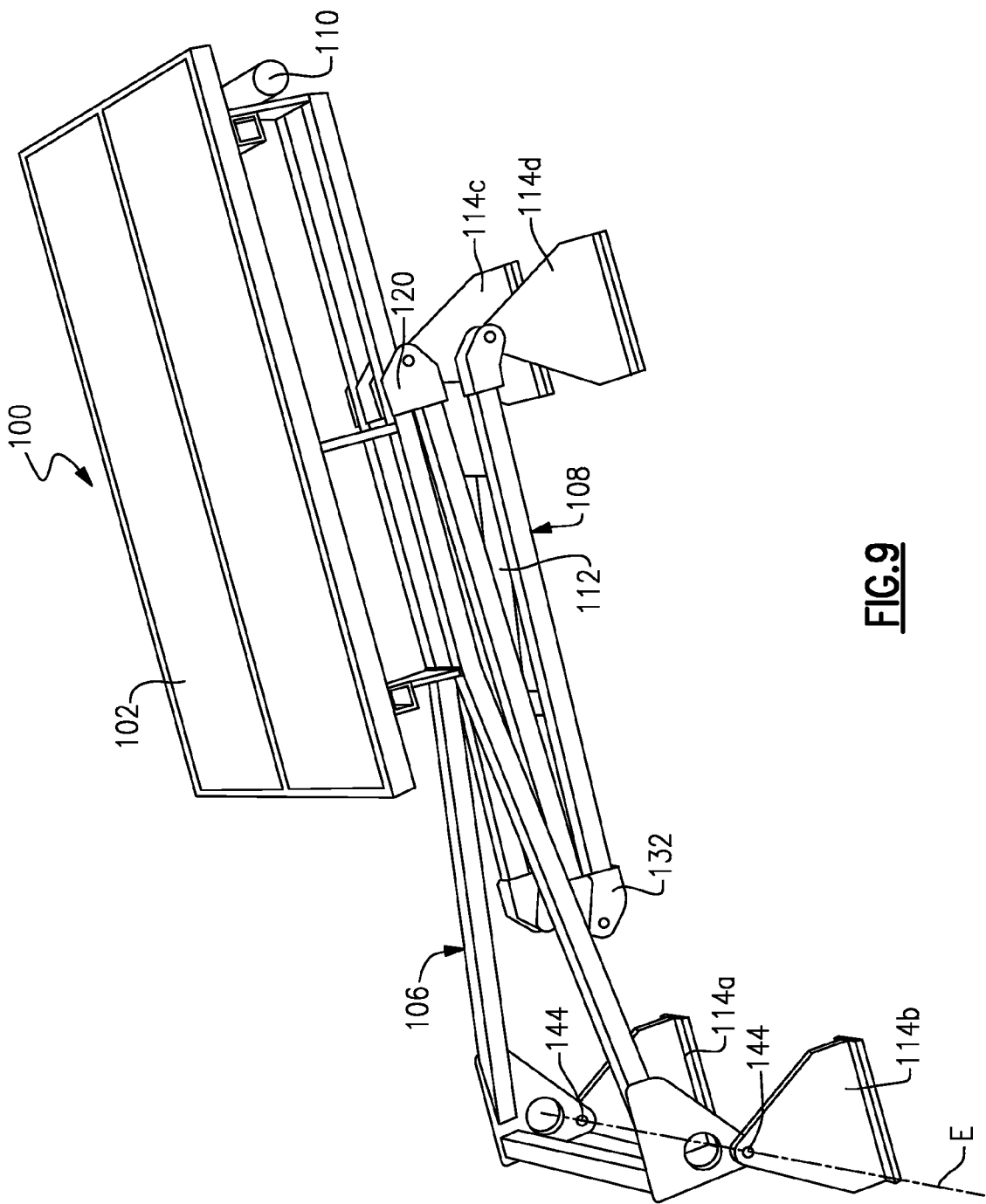
FIG. 9 is a perspective view of the second embodiment of the solar tracker in a stowed position.

FIG. 9 shows a perspective view solar tracker 100 in a stowed position. Similar to solar tracker 10, solar tracker 100 can be in either a raised position (FIG. 7) or a stowed position. To move solar tracker 100 into the stowed position, second actuator 112 telescopes in and pivots second linkage arm 108 at pivot joints 132 so that the intermediate section 108c of second linkage arm 108 moves toward the ground. As the intermediate section 108c of second linkage arm 108 lowers, second section 108b of second linkage arm 108 also pivots about third and fourth leg mounts 114c, 114d, which are attached to the ground. First section 108a of second linkage arm 108 also moves toward the ground as second linkage arm 108 pivots at pivot joint 132 and the intermediate section 108c lowers. This downward movement of second linkage arm 108 causes first end 106a of first linkage arm 106 to pivot about pivot joints 120 and also move toward the ground, with solar array 102. As first end 106a of first linkage arm 106 moves toward the ground, second section 106b of first linkage arm 106 pivots about first and second leg mounts 114a, 114b until solar tracker 100 is in the fully stowed position. In the stowed position, solar tracker 100 is low to the ground and thus better shielded from extreme weather conditions and flying debris that may damage solar array 102.

The solar tracker of the present invention is capable of withstanding extreme weather conditions and being moveable between a raised position and a stowed position. During normal operation, the solar tracker is in the raised position to capture a maximum amount of sunlight. During extreme weather, such as high winds, the solar tracker can retract the solar array into a stowed position. Two linear actuators control the elevational and azimuthal movement of the solar tracker in order to align a solar array with the sun during the day and to move the solar tracker between the raised and stowed positions. The solar tracker also spreads the load of the solar array such that the solar tracker can be mounted on a building structure.

In a first embodiment of the solar tracker, the solar array of the solar tracker is supported by a truss. The truss is designed to provide the solar tracker with increased side load resistance and is formed from a plurality of triangular truss sections that are connected to each other by a plurality of tubes. In a second embodiment of the solar tracker, the solar tracker includes a first and a second linkage arm that are pivotally connected to each other and to the solar array. The second linkage arm is also pivotable at a center point of the linkage arm to allow the solar tracker to retract toward the ground.

Although the present invention has been described with reference to preferred embodiments, workers skilled in the art will recognize that changes may be made in form and detail without departing from the spirit and scope of the invention.

The invention claimed is:

1. A two-axis solar tracker comprising:
a solar array for capturing sunlight;
a frame connected to the solar array;
a pivot frame pivotally connected to the frame to define an azimuthal axis;
a base pivotally connected to the pivot frame to define an elevation axis;
a connector mounted to the pivot frame;
a first actuator connected between the frame and the connector for controlling azimuthal movement of the solar array about the azimuthal axis; and
a second actuator connected between the base and the connector for controlling elevational movement of the solar array about the elevation axis.

2. The solar tracker of claim 1, wherein the pivot frame forms a truss.

3. The solar tracker of claim 2, wherein the pivot frame is formed of glass reinforced thermoplastic.

4. The solar tracker of claim 2, wherein the pivot frame is formed of extruded metal.

5. The solar tracker of claim 4, wherein the extruded metal is aluminum.

6. The solar tracker of claim 2, wherein the truss has a triangular shape.

7. The solar tracker of claim 1, wherein the first and second actuators are linear actuators.

8. The solar tracker of claim 1, wherein the pivot frame is a truss that supports the solar array.

9. The solar tracker of claim 8, wherein said truss extends diagonally across said solar array.

10. The solar tracker of claim 9, wherein said truss extends generally from a first corner of said solar array to a second opposite corner of said solar array.

11. The solar tracker of claim 8, wherein the truss is formed from a plurality of truss sections connected to one another to form an elongated triangular shape.

12. The solar tracker of claim 8, wherein the truss is formed of extruded metal or glass reinforced thermoplastic.

13. The solar tracker of claim 1, wherein the solar tracker is pivotable between a raised position and a stowed position about the elevation axis.

14. The solar tracker of claim 13, wherein said stowed position locates the solar array in a generally horizontal position.

15. The solar tracker of claim 14, wherein said solar array is completely contained within a plane defined thereby.

16. The solar tracker of claim 1, wherein the first actuator and the second actuator are attached to the connector in a transverse orientation.

17. The solar tracker of claim 1, wherein said solar array is completely contained within a plane defined thereby.

18. The solar tracker of claim 1, wherein the frame includes a plurality of supports, each support directly connected to at least one of the other supports.

19. A two-axis solar tracker comprising:
a solar array for capturing sunlight;
a frame connected to the solar array;
a first leg mount;
a first link arm pivotally connected to the first leg mount to define an elevation axis;
a pivot frame pivotally connected between the frame and the first link arm to define an azimuthal axis;
a first actuator connected between the frame and the first link arm for controlling azimuthal movement of the solar array about said azimuthal axis;
a second leg mount;
a second link arm pivotally connected to the second leg mount at a first section and pivotally connected to said first link arm at a second section, said second link arm includes a joint intermediate the first section and the second section; and
a second actuator connected between the first section and the second section for controlling elevational movement of the solar array about said elevation axis.

20. The solar tracker of claim 19, wherein the second actuator is pivotally mounted to the first section and pivotally mounted to the second section.

21. The solar tracker of claim 19, wherein the first and second actuators are linear actuators.

22. The solar tracker of claim 19, wherein the solar array captures sunlight.

23. The solar tracker of claim 19, wherein the solar array is substantially planar.

24. The solar tracker of claim 19, further including a third leg mount, wherein the first link arm is pivotally connected to the third leg mount.

25. The solar tracker of claim 24, further including a fourth leg mount, wherein the second link arm is pivotally connected to the fourth leg mount.

* * * * *